United States Patent
Ting

(10) Patent No.: US 11,595,413 B2
(45) Date of Patent: Feb. 28, 2023

(54) RESILIENT MANAGEMENT OF RESOURCE UTILIZATION

(71) Applicant: Intauleca Corp., Framingham, MA (US)

(72) Inventor: David M. T. Ting, Sudbury, MA (US)

(73) Assignee: Tausight, Inc., Sudbury, MA (US)

( * ) Notice: Subject to any disclaimer, the term of this patent is extended or adjusted under 35 U.S.C. 154(b) by 1027 days.

(21) Appl. No.: 16/286,965

(22) Filed: Feb. 27, 2019

(65) Prior Publication Data

US 2019/0273754 A1 Sep. 5, 2019

Related U.S. Application Data

(60) Provisional application No. 62/637,639, filed on Mar. 2, 2018, provisional application No. 62/637,012, filed on Mar. 1, 2018.

(51) Int. Cl.
*H04L 29/06* (2006.01)
*G06N 7/00* (2006.01)
(Continued)

(52) U.S. Cl.
CPC ............ *H04L 63/1425* (2013.01); *G06F 9/50* (2013.01); *G06F 9/541* (2013.01); *G06F 9/547* (2013.01);
(Continued)

(58) Field of Classification Search
CPC ... H04L 63/1433; H04L 63/1425; G06F 9/50; G06F 9/541; G06F 9/547; G06F 21/52;
(Continued)

(56) References Cited

U.S. PATENT DOCUMENTS 9,641,544 B1 * 5/2017 Treat ................. H04L 63/1425
9,794,272 B2 10/2017 Strub et al.
(Continued)

FOREIGN PATENT DOCUMENTS

CN 105930642 A 9/2016
WO 2014059885 A1 4/2014
(Continued)

OTHER PUBLICATIONS

Xia, F., et al., "Cyber-Physical Control over Wireless Sensor and Actuator Networks with Packet Loss", School of Software, Dalian University of Technology, Dalian 116620, China, Nov. 2010.

*Primary Examiner* — Joseph P Hirl
*Assistant Examiner* — Thomas A Gyorfi
(74) *Attorney, Agent, or Firm* — Morgan, Lewis & Bockius LLP

(57) ABSTRACT

Endpoint devices for use, e.g., in distributed environments such as a healthcare institutions comprise, in various embodiments, (i) a processor, (ii) an operating system, (iii) a computer memory, and (iv) instructions stored in the memory and executable by the processor for defining a plurality of user applications, a plurality of sensors for monitoring calls to the operating system, a plurality of actuators for causing the processor to take specified actions for mitigating a threat or anomaly, and an intelligent controller for analyzing time-windowed data from the sensors based on a predictive response model to detect anomalous behavior, and upon detecting such behavior, instructing an actuator to take a specified mitigation action.

23 Claims, 4 Drawing Sheets

(51) Int. Cl.
*G06N 20/00* (2019.01)
*G06F 9/50* (2006.01)
*G06F 9/54* (2006.01)
*H04L 9/40* (2022.01)
*G06N 3/088* (2023.01)
*G06F 21/52* (2013.01)

(52) U.S. Cl.
CPC ............. *G06F 21/52* (2013.01); *G06N 3/088* (2013.01); *G06N 7/005* (2013.01); *G06N 20/00* (2019.01); *H04L 63/1433* (2013.01)

(58) Field of Classification Search
CPC ...... G06F 21/554; G06N 20/00; G06N 7/005; G06N 3/088

See application file for complete search history.

(56) References Cited

U.S. PATENT DOCUMENTS

| | | | |
|---|---|---|---|
| 9,800,604 | B2 | 10/2017 | Knapp et al. |
| 10,558,809 | B1* | 2/2020 | Joyce ..................... G06N 20/10 |
| 10,673,880 | B1* | 6/2020 | Pratt .................... H04L 63/1433 |
| 11,075,929 | B1* | 7/2021 | Li .......................... G06N 20/20 |
| 11,194,901 | B2* | 12/2021 | El-Moussa ............ H04L 41/142 |
| 2017/0006047 | A1 | 1/2017 | Bharadwaj et al. |
| 2017/0093910 | A1* | 3/2017 | Gukal ................. H04L 63/1416 |
| 2017/0214702 | A1* | 7/2017 | Moscovici .......... H04W 12/122 |
| 2017/0288988 | A1* | 10/2017 | Pignataro ............ H04W 12/122 |
| 2018/0007084 | A1* | 1/2018 | Reddy ..................... G06N 20/00 |
| 2018/0234445 | A1* | 8/2018 | Bhatt .................. H04L 63/1425 |
| 2019/0220760 | A1* | 7/2019 | Kolar ................... H04L 41/142 |

FOREIGN PATENT DOCUMENTS

| | | | |
|---|---|---|---|
| WO | 2016053412 | A1 | 4/2016 |
| WO | 2017171639 | A1 | 10/2017 |

* cited by examiner

RESILIENT MANAGEMENT OF RESOURCE UTILIZATION

RELATED APPLICATIONS

This application claims the benefit of and priority to U.S. Provisional Patent Application Nos. 62/637,012, filed on Mar. 1, 2018, and 62/637,639, filed on Mar. 2, 2018, the entire disclosures of which are hereby incorporated herein by reference.

TECHNICAL FIELD

In various embodiments, the present invention relates generally to the detection and remediation of anomalous behavior in distributed, heterogeneous computational environments.

BACKGROUND

The information-technology (IT) infrastructure in a heterogeneous, broadly distributed environment presents numerous points of vulnerability to technologically sophisticated malefactors, who use viruses, worms and other techniques of infiltration to disrupt, steal or hold hostage all or part of the infrastructure. Indeed, the more flexible and feature-rich the infrastructure, the greater will be the vulnerability. The IT infrastructure of a healthcare institution, for example, is a hyperconnected network of monitoring devices, diagnostic equipment, therapeutic treatment devices, information systems, environmental systems, order-entry systems and an increasing number of so-called "Internet of things" (IoT) devices. The need to share patient medical records across organizational boundaries continues to erode the logical and security boundaries used to set access and security policies. Unlike other IT environments (such as financial services) that are homogeneous and strictly managed, the security infrastructure in healthcare is a heterogeneous fabric of operating systems, networking technologies and trust/authentication/audit models that are managed in a decentralized manner by multiple departments rather than a central IT organization. Medical devices, for example, often authenticate against their own server rather than a single central source of trust. In many organizations, clinicians access the IT system from different endpoints as they go from one patient to another. The "desktop" they use is frequently a lightweight shell that presents at the endpoint the set of applications they need (mimicking the look of a desktop) as they roam from location to location. This shell runs as a user application on top of an always-logged-in system account for faster access, but in doing so, it also bypasses the normal system provided privacy, privilege and security controls for the desktop. It also means that the normal system auditing of user activities cannot "see" the specific users logging in to the shell window, further complicating the security model.

The "detect, respond and recover" methodology applies system-control principles to an IT infrastructure, so the overall "system" operates within specified design goals and can remain stable even if the input (e.g., user actions) or components (e.g., operating system or applications) drift from their normal operating range. Control systems leverage sensors to measure the output characteristics of the various components being controlled so that actual output can be compared against expectations. Differences between actual and expected output generate corrective feedback to regulate the operation of the components and damp out variations in the input. Without this critical feedback loop, a system would run in an "open loop" manner that becomes unstable when the input to the system or the operation of individual components goes out of range. There are two levels of feedback corrections commonly in use: the first applies at the overall infrastructure level to account for the aggregate behavior of all the connected components together, and the second applies at the component level (i.e., endpoint devices) to ensure each component operates in a controlled fashion.

Cyber-resilience from a control-theory perspective can be modeled as a lattice of feedback and control paths operative at multiple levels, starting with the endpoints and then working up to the servers that store data, run applications, process transactions or interface with other systems. Measurements at a component level correspond to events generated by the operating system, applications and devices as well as actions initiated by the user, the application, the operating system, attached hardware components, external services and system monitoring or management tools. Each event represents a change in the state of the component being controlled and, depending on the chronology of earlier events, the source of the event and how it is classified, some feedback action may or may not be needed to regulate the operation of the system. An event produced when a known application opens a file, for example, may not trigger any corrective action because it fits into a normal operating mode for the user. A succession of opens for multiple files by an application (or multiple applications), by contrast, should trigger a protective response that begins at least by blocking access to files, suspending execution of the process and performing a more detailed analysis of its mode of operation and intent (why is it opening files in multiple directories?). When the process was installed, whether it is an interactive or headless application, how many times it has been run before, whether this behavior similar to what it did before, and the privilege level escalation requested are all factors that can influence the corrective response (if any) necessary to stabilize the system. The feedback response should be optimized based on the characteristics of the events that caused it to be labeled as an anomaly as well as historical evidence of the effectiveness of actions taken earlier.

The time delay or latency between recognition and analysis of an input and the onset of corrective action determines the stability of the system as well as the nature of the appropriate corrective response. Corrective responses that can take effect immediately (following the detection of a questionable event) are less intrusive because of the reduced potential for downstream damage. Malware that infects one endpoint, for example, has less chance of creating downstream damage if can be detected and immediately suspended or terminated before it can replicate across the network. The impact of a cyber-event increases if there is any delay between its onset (whether it is detected or not) and when corrective actions can be applied. The feedback loop for cyber-events today often involves a human to act on the alerts that are noticed by IT personnel. The time it takes to understand the anomaly, troubleshoot and determine the problem, characterize the risk, find a possible fix and apply it is valuable time lost—time during which time the malware may distribute and bury itself on multiple places and machines. The biggest challenge in resolving an issue (e.g., application machine running slowly) following its recognition may be diagnosing the problem. In addition, there is no easy way to analyze cause and effect from changes or events occurring across multiple endpoints and over time (e.g., changes made to system configuration slowly on multiple machines).

Hence, in a highly networked environment (such as a hospital, with thousands of endpoints running hundreds of applications and a significant number of attached devices that can generate billions of events), traditional IT departments and infrastructure are unable to process information fast enough to discover and diagnose critical cyber-events in a timely enough manner to ensure system recovery. IT needs a force multiplier that allows intelligent control mechanisms on edge devices, endpoints and servers to continuously examine events for anomalies and automatically trigger actionable responses at close to real time.

Threats can also be evaluated at the level of applications running on a particular machine. Software applications exist as binary-coded instructions and data organized into an "image" loadable into a computer's memory, and which then run as a scheduled process with its own instruction and stack pointers. Statically linked libraries represent segments of code and data offering common functionality that can be used by multiple applications but are loaded into memory with each application. Dynamic libraries (either .so or .dll) represent reusable segments of code and data that are bound and loaded into memory either when an application starts or through application-specific calls to explicitly load the library. These libraries contain interface code that applications use to access either physical (e.g., the disk, network or coprocessor) or logical (e.g., a semaphore, shared memory segment, pipe) resources managed by the operating system (OS). These capabilities are selectively exposed in software-development kits (SDKs) that connect to the underlying kernel that controls the run-time environment. Services (either local or remote) provide the calling application with additional means to access logical functionality from internal processes or external servers. Applications access these services (e.g., query a database or post an order to a transaction processor) using SDKs that internally also map to OS calls to connect and access system services. A call to query a remote database, for example, would make OS calls for lock and wait on a semaphore for exclusive access, connect and send requests over a port to a remote server and then wait and read back the results of the query. The dynamically linked libraries (DLLs) containing system functions provide the common mechanism that all applications use to bridge from what is commonly referred to as "user space" containing objects the user has the right to modify to "system space" with more restrictive access rights.

Every program running on a central processing unit (CPU) ultimately uses system resources to access capabilities beyond the boundary of the CPU chip. Even the simplest program that uses only the CPU and its stack with no input/output (I/O) still must rely on a system resource (the CPU) managed by the OS. A more complex program could require services on different servers, control multiple devices attached to the local USB bus, interface with the display and human interface devices and/or access computing services on backend servers. The ability of an application to affect the operating environment of an endpoint device or multiple endpoints depends on the type of system services requested, granted and ultimately used (or abused). A denial-of-service attack initiated by downloaded malware, for example, might start out running as a single process but then needs to launch multiple instances of itself on the local machine and start remote instances on remote machines. Discovering and characterizing the resources an application uses is a critical aspect of building cyber-resilience as applications typically fail when an unexpected issue comes up around resource access or use. An application might be unresponsive or slow due not to sluggish operation of the CPU but instead, for example, because of the response time from a remote database servicing the application. Understanding what resources are used and being able to quantify their availability and latency for delivering service is an important aspect of managing a computational infrastructure. From a cyber-security perspective, the resources an application wants and uses are also critical factors in determining whether a potential piece of software is benign, has the potential to be rogue, or is rogue. Newly downloaded software that attempts to enumerate system files, open multiple files or scan for open ports can be considered suspicious and untrusted.

In an enterprise setting where hundreds of applications are being used (a hospital, for example, might have a portfolio of 300-500 applications), it is very difficult to know when a problem occurs in the system or a particular application, as most user reports are subjective in nature (e.g., the computer "seems slow" or "doesn't respond"). The lack of metrics that can quantify whether the application or system is behaving within acceptable norms makes it particularly difficult for an information technology (IT) department to recreate, diagnose and troubleshoot—especially if the problem is ephemeral. The symptoms might also present differently depending on the endpoint device used, whether a particular user or a group of users experiences the problem, whether the symptoms occur at a specific time or all the time, and whether for a particular application workflow or all workflows. Understanding the relationship among these variables and the behavior of the system or application often requires judgment calls in scanning volumes of application, system and network logs. Compounding this problem is the ever-present possibility of the anomalous behavior being the result of a cyber attack that has invaded the infrastructure and presenting symptoms on random machines. In order to understand how the state of the infrastructure changes over time, it is necessary not only to have a complete inventory of the software modules (e.g., DLLs) that are installed as well as the applications and services that are normally running ("whitelisting"), but more importantly, a detailed description of all system resource used by each application. Only then can it be determined whether anything has changed. Without a detailed statistical description of resources used by each application there is no reliable way to detect or identify anomalous behavior at the application level.

SUMMARY

Embodiments of the invention deploy a hierarchical lattice of intelligent sensor/controller/actuator software components at managed endpoint devices and/or in network gateways. That is, each such device runs at least one sensor, at least one actuator, and, unless it is deployed remotely, the intelligent controller. Sensors monitor and analyze computational activity to detect potential anomalous behavior. The intelligent controller receives data from the sensors and analyzes these, generally on successive time windows of sensor data, by comparison against a model for acceptable or unacceptable resource use or behavior. At this system level, embodiments of the invention may make use of API shims, i.e., one or more libraries that transparently intercept application programming interface (API) calls and change the arguments that are passed; an API shim may also handle the called operation itself or redirect it elsewhere. Changes to application code are unnecessary.

As used herein, the term "application" means any running process on a computational device, and in a medical setting can include healthcare information (e.g., EMR) and workflow (e.g., CPOE) systems as well as conventional software such as word processors, spreadsheets, and browsers.

Accordingly, in a first aspect, the invention relates to a computational system comprising, in various embodiments, a plurality of endpoint devices each comprising (i) a processor, (ii) an operating system, (iii) a computer memory, and (iv) instructions stored in the memory and executable by the processor for defining a plurality of user applications, a plurality of sensors for monitoring calls to the operating system, a plurality of actuators for causing the processor to take specified actions for mitigating a threat or anomaly, and an intelligent controller for analyzing time-windowed data from the sensors based on a predictive response model to detect anomalous behavior, and upon detecting such behavior, instructing an actuator to take a specified mitigation action. In such embodiments, the system further comprises a network aggregator comprising for receiving data from the intelligent controllers of the endpoint devices, the received data including sensor data and data characterizing anomalous behavior detected by the predictive response models of the intelligent controllers. The network aggregator itself comprises (i) a processor, (ii) a computer memory for storing executable instructions and the predictive response models of the endpoint devices, and (iii) instructions stored in the memory and executable by the processor for updating at least some of the predictive response models based at least in part on data received from a plurality of intelligent controllers and communicating the updated predictive response models back to the associated intelligent controllers.

In various embodiments, the sensors each include a classifier—e.g., a Bayes classifier—for assessing a risk associated with the monitored calls to the operating system. Each of the applications running on an endpoint device may be associated with a unique sensor and a unique actuator, where each of the sensors monitoring the calls to the operating system using an API shim. The intelligent controllers may be configured to assess, after instructing an actuator to take a specified mitigation action, a degree of effectiveness of the mitigation action. For example, the data received by the network aggregator from the intelligent controllers may include the degree of effectiveness of the mitigation actions.

In some embodiments, the predictive response models of the intelligent controllers are machine-learning models. The machine-learning models may include a supervised and/or unsupervised learning algorithm. The predictive response models may be user-specific, and the network aggregator may be configured to update the predictive response models based on received sensor data as well as user behavior and privilege levels. For example, each endpoint device may further comprise a user database having fields for applications hosted by the endpoint device, permitted users for each application, and for each user, a pointer or link to a user-specific predictive model.

In another aspect, the invention pertains to an endpoint device comprising, in various embodiments, (i) a processor, (ii) an operating system, (iii) a computer memory, and (iv) instructions stored in the memory and executable by the processor for defining a plurality of user applications, a plurality of sensors for monitoring calls to the operating system, a plurality of actuators for causing the processor to take specified actions for mitigating a threat or anomaly, and an intelligent controller for analyzing time-windowed data from the sensors based on a predictive response model to detect anomalous behavior, and upon detecting such behavior, instructing an actuator to take a specified mitigation action.

In various embodiments, the sensors each include a classifier—e.g., a Bayes classifier—for assessing a risk associated with the monitored calls to the operating system. Each of the applications running on an endpoint device may be associated with a unique sensor and a unique actuator, where each of the sensors monitoring the calls to the operating system using an API shim. The intelligent controllers may be configured to assess, after instructing an actuator to take a specified mitigation action, a degree of effectiveness of the mitigation action. For example, the data received by the network aggregator from the intelligent controllers may include the degree of effectiveness of the mitigation actions.

In some embodiments, the predictive response models of the intelligent controllers are machine-learning models. The machine-learning models may include a supervised and/or unsupervised learning algorithm. The predictive response models may be user-specific, and the network aggregator may be configured to update the predictive response models based on received sensor data as well as user behavior and privilege levels. For example, the endpoint device may further comprise a user database having fields for applications hosted by the endpoint device, permitted users for each application, and for each user, a pointer or link to a user-specific predictive model.

Yet another aspect of the invention relates to a computational method. In various embodiments, the method comprises the steps of executing, at a plurality of endpoint devices, a plurality of user applications and (i) a sensor associated with each of the applications, the sensor for an application monitoring calls to the operating system by the associated application and generating data indicative of the calls, (ii) an actuator associated with each of the applications for taking actions to mitigate a threat or anomaly, and (iii) an intelligent controller for analyzing time-windowed data from the sensors based on a predictive response model to detect anomalous behavior, and upon detecting such behavior, instructing an actuator to take a specified mitigation action, and at a network aggregator, receiving data from the intelligent controllers of the endpoint devices, the received data including sensor data and data characterizing anomalous behavior detected by the predictive response models of the intelligent controllers. In such embodiments, the method further includes, at the network aggregator, updating at least some of the predictive response models based at least in part on data received from a plurality of intelligent controllers and communicating the updated predictive response models back to the associated intelligent controllers.

The method may further comprise executing, by the sensors, a classifier—e.g., a Bayes classifier—for assessing a risk associated with the monitored calls to the operating system. Each of the sensors monitors the calls to the operating system using an API shim. In some embodiments the method further comprises assessing, by the intelligent controllers after instructing an actuator to take a specified mitigation action, a degree of effectiveness of the mitigation action. The data received by the network aggregator from the intelligent controllers may include the degree of effectiveness of the mitigation actions.

In some embodiments, the predictive response models of the intelligent controllers are machine-learning models that include a supervised and/or unsupervised learning algorithm. The predictive response models may be user-specific and, in some embodiments, the method includes updating the predictive response models based on received sensor data as well as user behavior and privilege levels.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

A. Managed Endpoint Devices

Particularly in a healthcare institution such as a hospital, endpoint devices can be large in number and highly varied, and typically include desktop workstations, laptops, kiosks, a wide variety of specialized medical monitoring devices that transmit data over the institution's network, tablets and even "smartphones" utilized by clinical personnel and hosting applications with access to patient information and electronic medical records (EMR). The ensuing discussion will focus on healthcare applications, but it should be understood that the invention has broad applicability across business, government, and other large-scale environments involving many devices and proportionate vulnerability to threats.

Figure 1:
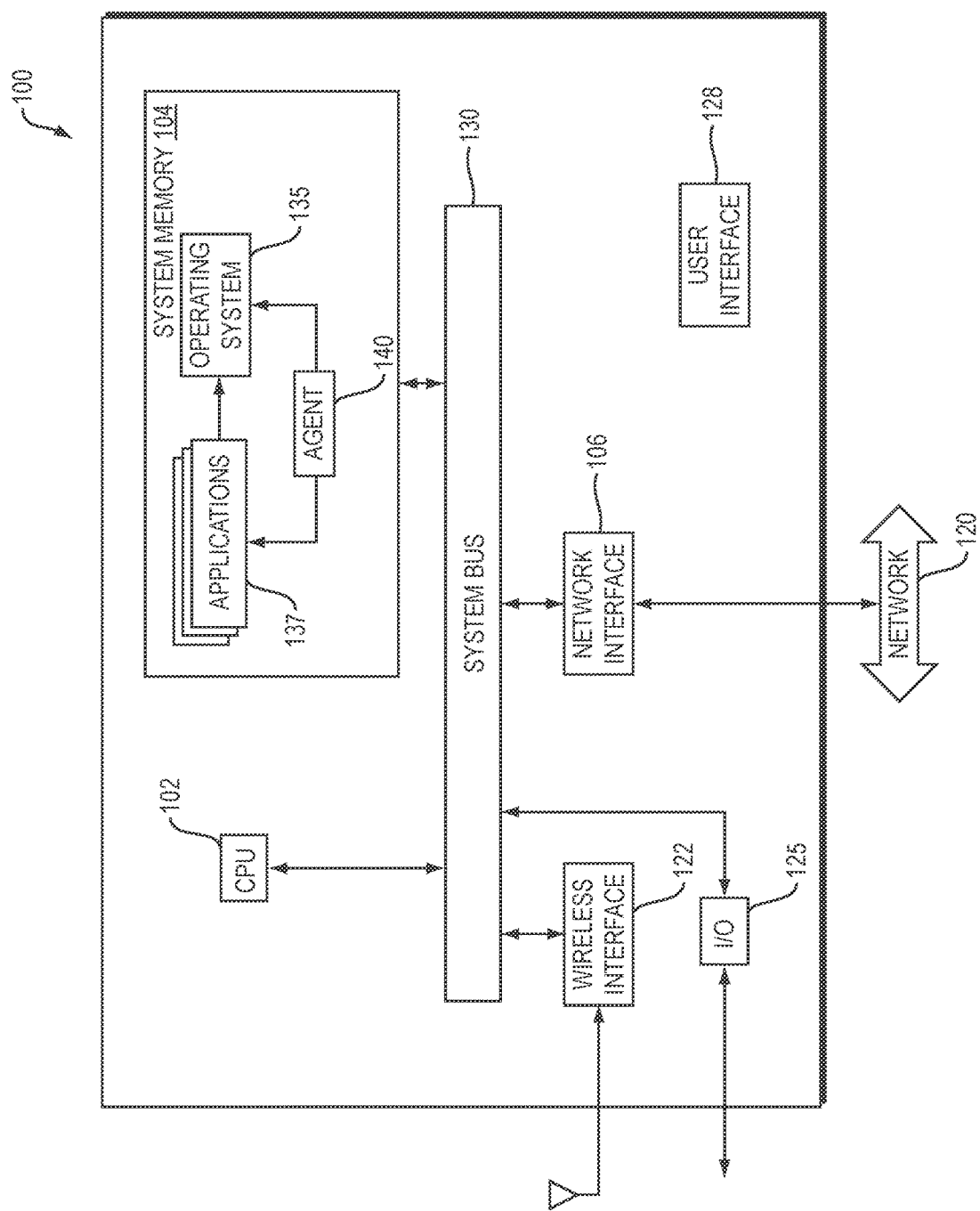
FIG. 1 schematically illustrates a hardware implementation of an endpoint device.

FIG. 1 illustrates a representative endpoint device 100, which may be any of the foregoing types of devices or any other device with which clinicians and other users interact. The device 100 typically includes a processor 102 (e.g., a CPU microprocessor) and associated system memory 104, a network interface 106 (for connection to the institutional network 120 and/or the Internet), and, usually, one or more non-volatile digital storage elements (such as a hard disk, CD, DVD, USB memory key, etc.) and associated drives. A wireless interface 122, which may be separate from or implemented within the network interface 106, facilitates wireless communication with, for example, user mobile devices. The input/output (I/O) block 125 performs functions dictated by the nature of the device 100. A medical monitoring device will have I/O to, for example, physiologic and/or medication sensors with relatively little user access, while an EMR system may include traditional user input/output devices such as a display screen and conventional tactile input devices such as touchscreen, keyboard and mouse or touch pad, etc., and may provide a user interface 128. The various components communicate with each other via one or more bidirectional buses 130.

In use, the processor 102 executes one or more computer programs (conceptually illustrated as program modules) stored in the system memory 104. In particular, an operating system 135 (such as, e.g., MICROSOFT WINDOWS, LINUX, UNIX, iOS, or ANDROID) provides low-level system functions, such as file management, resource allocation, and routing of messages from and to hardware devices (such as I/O device(s) 125) and one or more higher-level user applications (such as EMR applications, office programs, a web browser, etc.) 137. An agent 140, described in greater detail below and corresponding to the sensor, actuator and/or intelligent controller, executes various functions in accordance with embodiments of the invention. The agent 140 may be implemented by computer-executable instructions, such as program modules, that are executed by a conventional computer. Generally, program modules include routines, programs, objects, components, data structures, etc. that perform particular tasks or implement particular abstract data types. Those skilled in the art will appreciate that the invention may be practiced with various computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

Thus, endpoint devices and servers as described herein may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system and application programs, as discussed above, as well as other program modules and program data.

Any suitable programming language may be used to implement without undue experimentation the analytical functions described above and in the attached paper. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The computing environment may also include other removable/nonremovable, volatile/nonvolatile computer storage media such as solid-state drives, magnetic disk drives, optical drives, etc. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The CPU 102 that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention.

B. Hierarchical Cyber-Resiliency System and Methods

A cyber-event is any intentional or unintentional activity that compromises the ability of the IT infrastructure to deliver reliable and trusted level computing service for users. Cyber-events can occur within an application, the operating system, the computing device itself, an attached hardware device, the computing network or the servers that support the application. Anomalies may be represented as outliers in a multi-dimensional measurement (or feature) space characterizing system behavior such as response times for interactive, system connectivity, service response, resource allocation, etc. A slow-running application, the inability to access network resources, or an inoperative USB device are typical cyber-events that a helpdesk team may handle.

Proper diagnosis of a cyber-event may require correlating cause and effect for behaviors involving the system and service resources required by an application, identifying differences in the state of the system and resources over time, and correlating changes relating to the current state of affected system components. Embodiments of the invention promote infrastructure resilience using closed-loop control behavior that can operate at or close to real-time to offer semi-autonomous corrective control at both individual component level and across multiple components in the network. In various embodiments, a hierarchical lattice of modules (which may be realized in software and/or hardware) consisting of or including intelligent sensor/controller/actuator components are deployed at various levels within the IT infrastructure, including within managed endpoint devices and/or in network gateways used to bridge unmanaged devices to the corporate connect network. "Sensors" detect and may in some cases analyze and even generate activity on a device. Sensors can produce their own events or receive them from the operating system, a running process or a tool such as an antivirus package or endpoint control program. Sensors normalize the input and classify it based on the resources the application or services are consuming. In this regard, resources are not limited to physical objects such memory, CPU/coprocessor, storage, network and attached devices, but also include logical objects such as files, handles, pipes, semaphores, privileges, etc.

In various embodiments, each endpoint device in a system includes one or more sensors, actuators, and intelligent controllers. Sensors monitor and analyze computational activity to detect potential anomalous behavior. The intelligent controller receives data from the sensors and analyzes these, generally on successive time windows of sensor data, by comparison against a model for acceptable or unacceptable resource use or behavior. The "reflexive" action taken by the controller in the event of a detected threat is biased towards being defensive to limit the potential for harm to the endpoint—i.e., to minimize risks to an application, data and/or the endpoint device hardware—rather than the overall infrastructure. The scope of analysis by the intelligent controller can encompass not only streamed events but also historical events (depending on the size of the window) previously observed. The controller uses predictive analysis to map input sensor events against one or more response models to identify what if any action should be taken.

Actuators respond to the controller by carrying out the actions that the controller commands in order to ensure system resiliency. Actuators have the capability to apply privileged commands to any process, service or resource of the devices on which the actuators are deployed, and can, for example, suspend or terminate a process or service, block access to system resources (e.g., files, network, display, privileged operating-system services), block user input from being entered, run diagnostics and remediation tasks (e.g. restarting a service, applying a critical patch, resetting a USB port). Actions can also be used to alter the actual call parameters to adjust privilege levels, for example, or to redirect the path for a server request to an alternate server.

Thus, combined sensor, intelligent controller and actuator software may be deployed together on the endpoint device and run with the same privilege level as other operating-system services. They have local, immediate influence on the devices on which they are deployed, but can also propagate sensed conditions to higher-level controllers (e.g., a controller for all or a portion of the network). For example, any problem sensed by an intelligent controller and requiring immediate local remediation may be passed to a higher-level controller, which uses time-window-based predictive analytics on data aggregated from numerous endpoint controllers to identify system-wide problems. A problem that seems system-wide, however, can sometimes be traced to a particular user who accesses multiple endpoint devices in the course of a day or shift; this frequently occurs in healthcare environments, as clinicians move from place to place and patient to patient. Once again, aggregating the data will allow a higher-level controller to detect the factor common to all affected devices and pinpoint the source of the problem.

At the same time, a higher-level controller may also receive routine periodic data from endpoint-level intelligent controllers as well as data indicative of endpoint anomalies that do not require immediate local remediation. Enough endpoints exhibiting similar anomalies, even if these are individually non-threatening, may indicate a system-wide problem (unattributable to a particular user) that will trigger system-level remediation measures.

Figure 2:
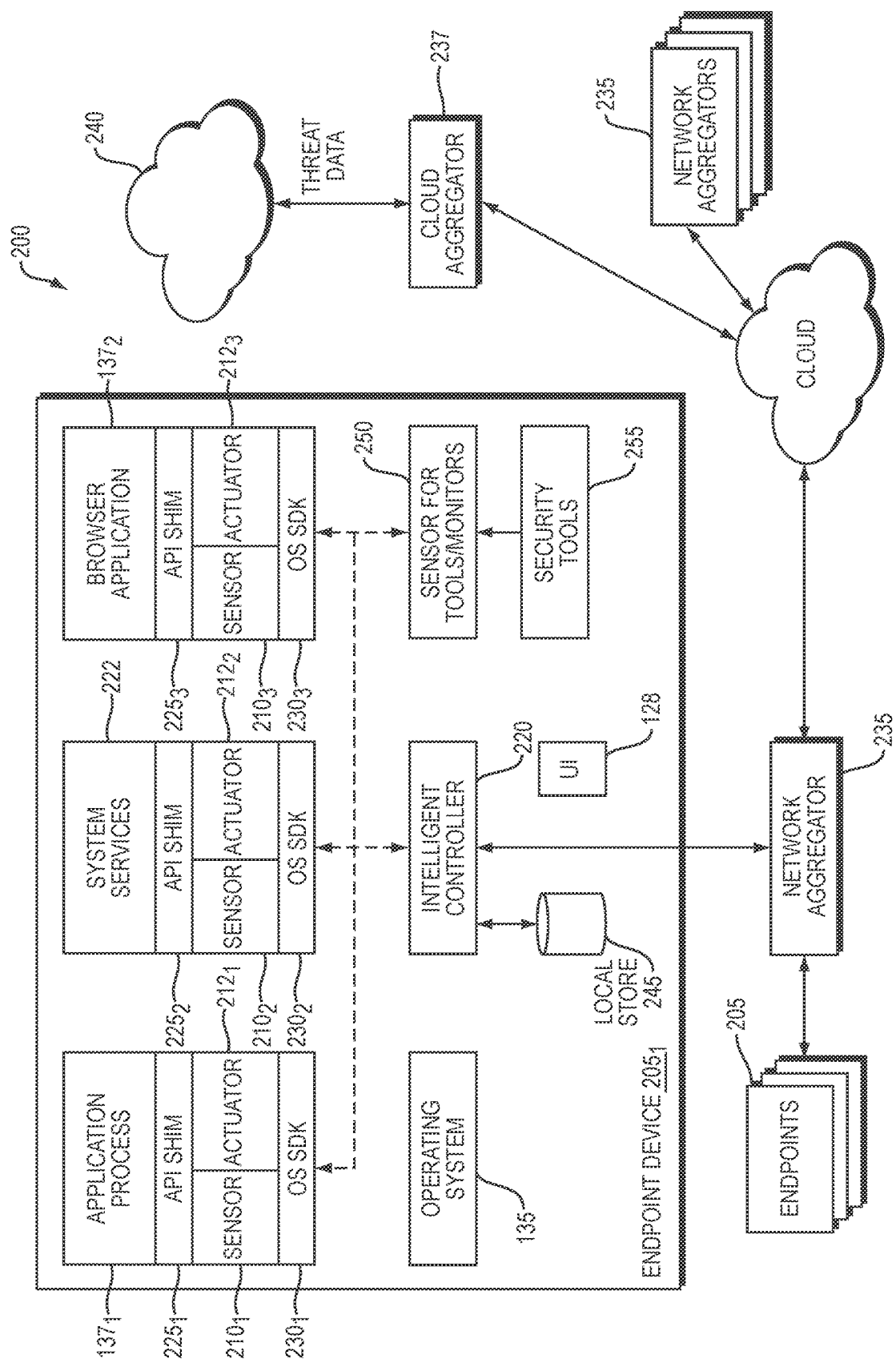
FIG. 2 schematically illustrates, in greater detail, components of a cyber-resiliency architecture in accordance with embodiments hereof.

A representative system-level configuration 200 is shown in FIG. 2. The system includes a plurality of endpoint devices 205, one of which is shown in greater detail at 205*i*. The endpoint device 200 has the general hardware configuration described above in connection with FIG. 1, but the functions of the agent 140 are distributed among the sensors 210, the actuators 212, and the intelligent controller 220. As illustrated, each application $137_1$, $137_2$ and the system services functionality 222 provided by the operating system 135 have individual instances of a sensor 210 and actuator 212 associated therewith. (Obviously there can be more applications resident and/or running on an endpoint device 205 at any time; two are shown representatively in FIG. 2, and with the system services 222 are collectively referred to as "processes.")

Each process is also associated with an API shim 225, i.e., a small library that transparently intercepts an API, changing the parameters passed and/or redirecting the operation to the associated 210 sensor and actuator 212 as described in further detail below. The API shim 225, sensor 210 and actuator 212 are DLL instances loaded into each process; modification of the code defining the processes 137, 222 is unnecessary. In actual programming, the code/instruction portion of the DLL is the same for all instances on the endpoint 200, and the only portion unique to each process instance is the data (i.e., the stack, which is necessarily specific to each application). Thus, a valid logical representation of the endpoint might depict a single sensor and actuator to which all of the processes are directed.

The sensor 210 instances and actuator 212 instances are each associated with an OS SDK instance 230 to facilitate interaction with physical resources such as memory, computing, storage, network connections, devices or logical resources such as semaphores, privileges, pipes, shared memory segments, tokens, etc. The OS SDK, like system services 222, represents operating-system functionality connecting to the underlying OS kernel that controls the runtime environment of the endpoint device 205.

The intelligent controller 220 receives data from the sensors 210 and the actuators 212. Control and data paths link the intelligent controllers of multiple (or all) endpoint devices 205 to one or more system-level network aggregators 235 capable of assessing information from multiple endpoint devices 205 to generate directives that can be fed back to the device-level intelligent controllers 220 in a uniform and continuous manner. The network aggregator may have a hardware architecture like that shown in FIG. 1, and include a CPU, system memory, storage device, and interfaces, and may include executable instructions defining an analysis module for analyzing the received endpoint device data as described herein. The network aggregator 235 may also contain a sensor, actuator and controller operating on system-level data with system-level effects. In addition, network aggregators may be used to filter, classify and selectively upload site-specific information to a cloud-hosted aggregator controller 237, which receives such information from multiple network aggregators 235 and is capable of responding to patterns occurring at multiple locations or across aggregators 235. The aggregator controller 237 may also accept threat data from external sources 240, e.g., via the internet; such external sources may include, for example, commercial threat-monitoring services. This bi-directional exchange of control directives as well as site-generated information also allows for comparison and ranking of system metrics with provision to facilitate additional analytics, as the data can be made available to the network aggregators 235 and the cloud aggregator 237.

Figure 3:
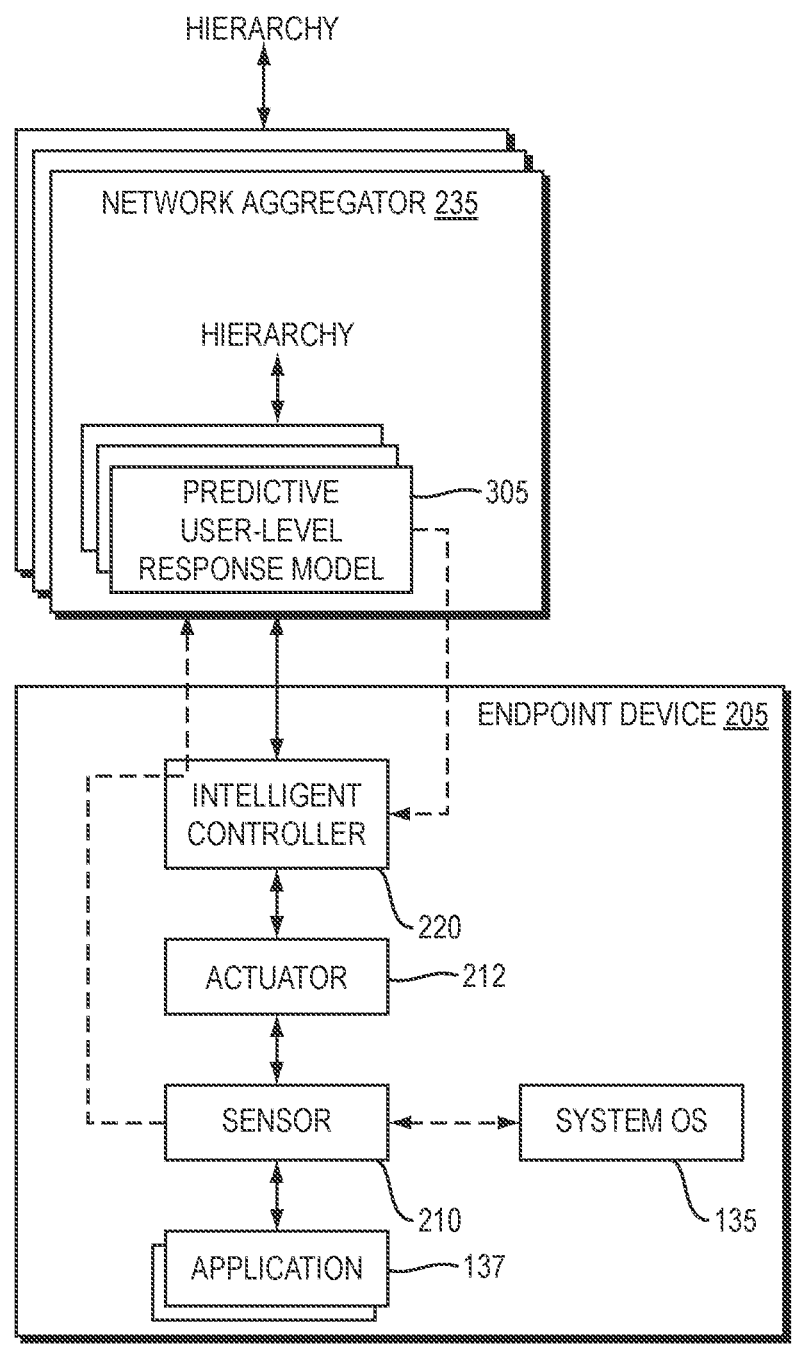
FIG. 3 schematically illustrates a hierarchically organized system for cyber-resiliency in accordance with embodiments hereof.

The hierarchy of passing information from lower aggregators in the endpoint devices to higher-level aggregators, illustrated in greater detail in FIG. 3, allows for decentralized autonomous operation and enables scaling for potentially large numbers of endpoints. This reduces the potential for a single point of failure or bottleneck in the event that multiple controllers simultaneously broadcast their experience dealing with the same problem. As shown in FIG. 3, each endpoint device communicates anomaly data to its associated network aggregator 235 on a continuous or fixed periodic basis. The network aggregators 205 may be organized hierarchically, e.g., with each aggregator at a first level responsible for its own set of endpoint devices and each implementing a predictive analytic model based on the data received from its associated set of endpoint devices (more specifically, the controllers of such devices, which themselves receive data from the associated sensors). Output from these predictive analytic models, rather than raw endpoint data, may be fed to successively higher levels of aggregators that "see" a progressively wider system-level view and consequently model and predict behavior on closer to a system-wide level. As a result, predictions made by higher-level aggregators may have broader system-level applicability, so that, for example, a threat detected by a higher-level aggregator may result in remediation propagated to all endpoint devices associated with hierarchically lower aggregators—thereby ensuring that all devices potentially at risk, even ones that have not yet detected any anomalies, are remediated while avoiding unnecessary action (which can be disruptive) with respect to devices not at risk. In this way, remediation measures are addressed to, and also confined to, the entire "blast radius" of the detected threat.

With renewed reference to FIG. 2, in operation, within each endpoint device 205, sensor and actuator functionality are enabled with respect to running processes to gain visibility to their operation and to allow remote control to defend the device (in particular, the OS 135) from process-invading threats. The sensor, intelligent controller and actuator modules (collectively, SCA modules) run with the same privilege level as other OS services. Their primary purpose is to have local immediate influence on endpoint devices (i.e., reflex actions), remediating anomalies or isolating obvious threats from other devices. In addition, endpoint SCA modules act as preprocessors, downsampling and analyzing high-frequency events and, as discussed, passing them up to hierarchically superior network nodes with visibility to events/actions/results collected from multiple endpoints. A worm propagating across a network would be detected by the network aggregator 235 because its presence and execution would be reported by multiple controllers 220 running on endpoints 205, even though those controllers 220 independently address the worm problem locally on their respective devices 205. The response model used by higher-level network controllers and aggregators is updated with the new directive block, and any such device may terminate the worm on hierarchically inferior devices if propagation is detected. Again, this ability to share intelligence is critical to containing the damage as well as facilitating the recovery.

Actuators 212 carry out the actions identified by the controller 220 to ensure system resilience; that is, although the actions are carried out with respect to the device on which the actuator 212 is operative, they may terminate device-specific threats that could have system-wide effects or carry out, on the device, a system-wide directive to block use of particular APIs or network services (e.g., unpatched SMB as used in the WannaCry attack). Actuators 212 may have the capability, for example, to apply privileged commands to any process, service or resource; suspend or terminate a process or service; block access to system resources (e.g., files, network, display, privileged OS services); block user input from being entered; and run diagnostic as well as remediation tasks (e.g., restarting a service, applying a critical patch, resetting a USB port). Actuators 212 carry out any mitigation actions determined by the intelligent controller 220 and can perform actions such as isolating an application, locking out resource access from the application, or more intrusive actions such as isolating the endpoint or forcing the machine offline (i.e., taking itself offline). This architecture offers healing capabilities to repair the application, operating system, and/or firmware as mandated by the intelligent controller.

Sensor output, which may be raw or initially analyzed data, is processed by the intelligent controller 220 to detect potential anomalous behavior. The intelligent controller 220 performs temporal analysis on a moving window of sensor output corresponding to cyber-events, and may compare sensor output data against a model for acceptable or unacceptable resource use to determine if any actions need to be taken to secure the system. This reflexive response may be biased toward being defensive to limit the potential for harm to the device 205 or the overall infrastructure. The scope of analysis can encompass not only current events but also historical events (depending on the size of the window) previously observed. The controller 220 preferably uses predictive analysis to map input sensor events against one or more response models to identify what if any action should be taken. As used herein, the term "predictive analysis" broadly connotes analytical, probabilistic and statistical techniques for predicting device or system behavior from some form input. Predictive analytic techniques useful herein include straightforward analytic equations and parameterized models, as well as machine-learning and related techniques that make automated decisions (or draw automated conclusions) based on algorithms or models trained on data and adjusted through feedback so that performance improves over time. Such techniques include supervised learning algorithms including linear and logistic regression, tree classifiers, and neural networks (e.g., recurrent neural networks) that utilize systems of computational nodes connected in patterns, and unsupervised learning techniques such as clustering (e.g., k-means or hierarchical clustering).

The risk probability generated from sensor data accumulated within a time window is constantly compared by the intelligent controller 220 against its predictive model, which returns the most appropriate response that the actuator 212 (associated with the reporting sensor 210) needs to perform, if any. The response triggers either a single command or a sequence of commands to mitigate the anomalous situation determined by the intelligent controller 220. The actuator 212 notifies the intelligent controller 220 when it completes a response so the controller can reassess whether the action has mitigated the problem or threat. Sensor data is collected and examined over a time window so the intelligent controller 220 is able to compare the state of the application before, during and after the actuator is triggered. The actuator 212 can cause the intelligent controller 220 to re-analyze the sensor data based on changes in the monitored application or system state resulting from the actions just taken by the actuator 212. In some embodiments, one of the inputs to the intelligent controller 220 is the number of re-analysis iterations performed; a ceiling on the allowed number of iterations is employed to prevent endless looping.

This success or failure of the mitigation response teaches the intelligent controller to modify its behavior as needed, i.e., the controller's predictive model is progressively refined, retaining and integrating knowledge of what worked and what did not. This prevents generation of an endless loop of responses to an anomaly, and also provides a mechanism for escalating the impact of actions taken by the actuators.

The API shims 225 allows the sensors 210 to gain visibility not only into the calls and call sequence but also the call arguments and return values so they can be recorded and analyzed. The API shims 225 are injected without requiring modification to the associated running application and run as separate threads in the address space of the process. In particular, the API shims 225 provide access to the system calls made by each process before these calls are passed on to the OS API and are serviced by the underlying OS 135. This allows the associated sensor 210 to continuously stream information about what OS resources the process is requesting, and this preview capability may be used to gate whether resource access is allowed or denied. Applications typically go through an initialization phase (prior to presenting or accepting user input) during which they access window resources (such as display and keyboard/mice), configuration files, registry keys, shared memory segments, network connections, services, processes and/or privilege levels. During the startup phase—the onset of which may be signaled when the application notifies the operating system that it is ready to accept user input from the keyboard, mouse, audio input or other device (e.g. a track ball or wheel)—special attention is paid by the sensor 210 to the type of resource, the sequence in which resources are requested, which resources are requested, the response time and the type of operation applied to the resource (e.g., file read or registry write), as these indicate the intent of the application. The "signature" for the process is determined by the sequence of resources accessed prior to the application accepting user input. A process making requests for elevated privileges and opening open files in the system directory, for example, would have a higher probability of being malware based on the risks (conditional probabilities) of the calls when they are used independently. Following initialization, applications 137 run in a mode in which resource use is determined by user actions, so sensor data generated by the API shim 225 are classified differently (as the resources requested have greater variability compared to the more predictable—and repeatable—behavior during application startup). The ability (or lack thereof) of an application to handle user input can represent an attribute employed by the intelligent controller 220. A so-called "headless app," for example, is always more dangerous than an application with a user interface (unless the window is set to be 1×1 pixel—a well-known sign of high risk).

The sensors 210 intercept, interpret and classify call information to decide the relevance and potential of the call to be benign or hostile. For example, the risk posed by a combination of system calls can be computed using a machine-learning algorithm, e.g., a generalized Bayes classifier and conditional risk probabilities of individual calls. Alternatively, algorithms such as logistic regression or support vector machines can be employed. Analyzed information is streamed to the controller 220, which further analyzes the information using a classifier that examines the data over a time window to determine whether the associated process is hostile or has been infected. The controller 220 may utilize a local store 245 (e.g., a partition of a mass-storage device, such as a hard disk) to store and update one or more predictive models. The controller 220 maps input events received from the sensors 210 against one or more of these models to determine whether corrective action should be taken at the process level by any of the actuators 212. By issuing commands to the actuator 212 of a process, the controller can take remote control over the process and, if necessary, block the process from accessing a resource, suspend or terminate its operation, or wait for a response from the user or the IT organization to allow or deny access.

As this sequence of detect, decide and respond takes place immediately as system calls are being made, the potential for a rogue process to cause downstream damage is considerably reduced. If there is a specific vulnerability in the system, such as the use of SMB ports as exploited by the Wannacry ransomware attack, even without patching every machine, a directive from the network aggregator 235 to individual controllers 220 can block the use of system calls that open the SMB port for unknown applications. This is obviously easier to manage than patching every system with the latest update.

In addition to sensors that are injected into running processes, one or more stand-alone sensors 250 within an endpoint device 205 can process event data generated by monitoring, security and auditing software 255. Suitable (and conventional) converters within the stand-alone sensor 250 parse input data in syslog formats to commingle the event logs alongside the real-time data generated by the sensors 210. Log data, of course, are often batched and may only be accessible following several seconds or minutes of delay as they are streamed when they become available. The intelligent controller 220 buffers analyzed events, and responses may be persisted in the local store 245 (which can be optimized either for columnar or named key-pair access). Filtered events relevant to other endpoints 205 are propagated to the network aggregator 235 to facilitate analysis across significant events and actionable responses at multiple endpoints. These network aggregators operate in the same manner as (and, as noted, may contain) intelligent controllers, but analyze and react to events and actions that already have been processed by endpoints 205 and represent a cumulative picture of what the endpoints 205 are dealing with. The network aggregators 235 integrate successful endpoint measures in their own predictive models, which are re-tuned when they receive data from each controller 220 regarding the results of applying specific responses to different types of events. Reinforcement of the pattern is achieved when the same event-response is successfully applied at many endpoints 205. The event data and the predictive analytics models may be persisted in storage either as columnar or key-value pairs.

Updates to the controller's predictive model for addressing anomalies are propagated to the network aggregator 235 so that the information can be correlated from multiple endpoints. The network aggregator 235, as noted, has the supervisory role of sharing knowledge discovered at one endpoint 205 with other endpoints. A controller 220 that uploaded its successful detection and mitigation of newly installed malware using high-risk system services (e.g., a worm attempting to open system files) is able to share, through the network aggregator 235, its updated predictive model with the controllers on other endpoints 205 as noted. By aggregating filtered sensor data preprocessed by intelligent controllers 220 at each endpoint 205, the network aggregator 235 is able to detect trends distributed over time and endpoints. Intelligent controllers 220 at multiple endpoints 205 reporting long latency in getting access to a specific network server, for example, will be detected by the network aggregator 235, and using its predictive model, the network aggregator may generate a mitigating response such as a restart of the gateway that connects the particular endpoints to the server.

A network aggregator 235 acts as supervisor for some or all of the intelligent controllers, e.g., within a campus or even the entire organization. The ability of network aggregators to communicate and share sensor data and predictive models with other network aggregators allows the hierarchical network to scale to handle large numbers of endpoint devices. This is particularly important with the exponential growth in the number of "internet of things" (IoT) devices deployed within any large organization. Sensor data managed by the network aggregators represent the output of two levels of filtering: the first performed at the sensors 210 bound to individual processes using a risk classifier, and the second by the intelligent controllers using a predictive model to generate responses. This hierarchical filtering reduces the timing sensitivity and the volume of data that individual network aggregators must process. This partitioning also allows each level of feedback control to be time-sensitive (i.e., exhibit low latency) and fine-grained, facilitating small adjustments and escalating only when the small steps are not impactful. An unknown application making a privilege escalation call, for example, might generate a response by the intelligent controller to request a confirmation by the user (i.e., do you want this application to continue?). If the application is allowed to continue but makes another high-risk call such as attempting to open a system directory to access files, the intelligent controller 220 may initiate a defensive action to terminate the application and lock it out from being used again (of course notifying the user). The a posteriori knowledge of the potential danger of this new application results in modification to the local predictive model used to drive responses at the endpoint 205. Uploading it to the network aggregator 235 allows that local model to be shared with other controllers so they will recognize the application behavior (i.e., new process wants to elevate privilege and open the system directory) and the appropriate response (block the process from starting). That is, one function of the network aggregator 235 is to update the predictive model used by the various controllers 220 that report to it. In some embodiments, the network aggregator 235 and/or a controller under its supervision may update even the lower-level risk classifier used by sensors 210.

In a healthcare setting where users roam, the network aggregator 235 may characterize (i.e., learn) the behavior of individual clinicians as they go from one endpoint 205 to another—that is, correlate user patterns extending over multiple machines. This allows the network aggregator 235 to adapt the predictive response model used by the intelligent controller 220 of that endpoint 205 when a particular user authenticates into a session; controller-level predictive models, in other words, may be specific to different users, since different users have varying use habits and privilege levels that bear on risk. A new user to the system will have a default response model determined by the group affiliation (e.g., WINDOWS Active Domain) so that, for example, a cardiologist would have the default model that applies to all cardiologists but, over time, the response model becomes more tuned to the particular individual's needs. This adaptation takes place in the network aggregator 235 because it is able to receive sensor and response data from all the endpoints 205 with which the user engages. Hence, the local store 245 may include a user database having fields for applications hosted by the endpoint device 205, permitted users for each application, and for each user, a pointer or link to a user-specific predictive model also stored on the storage device 245.

The network aggregator 235 maintains the persisted store of response models for users and, following successful log-in by a user at an endpoint 205, the intelligent controller 220 requests (and loads) the user's response model. This allows it to apply the adaptation relevant for the user such as the range of privileges required for different applications, the types of files normally opened, the average amount of memory consumed, the performance behavior on network connections, etc. In effect, the response model acts at one level like a resource-access policy for the user but its behavior is more adaptive and, rather than being constraint-driven (you can do this but not that), it becomes risk driven (this is allowed because it has a low risk). The response model for a user is a subset of the rights allowed for each group of users but with adaptability, allowing the system to operate in conformance to the principle of least user privilege.

Relevant sensor data streamed to the network aggregator 235 can be analyzed across time and endpoints for troubleshooting purposes, as the data reflects a chronology of changes over time. Time-based dependency analysis using this data facilitates identification of the source of an anomaly, e.g., the change to a configuration file several days ago is the reason why an application now stops working. As a practical matter, the ability to perform this level of analysis depends on aggregating sensor data from the endpoint controllers 220.

The predictive response models for users managed by the network aggregators 235 can be shared and blended with models from other network aggregators if the organization deploys multiple aggregators. The response models for all users can be further filtered and de-identified so that only endpoint, environment and application data are maintained. This level of granularity enables sharing the response models with the cloud aggregator 237 across organizational boundaries. The de-identified response model encapsulates predictive responses on new attack patterns (e.g., worm attacks by injecting into a running process, elevating privilege and opening system files) and how best to respond (e.g., block file level access, terminate and block further use), operational information around system performance (e.g., my VDI desktop performs with a particular latency), and confers the ability to respond to externally identified software vulnerabilities (e.g., particular open source modules are known to be vulnerable, block their use if found and update as needed). This hierarchical scheme is not unlike the levels of neurons used in processing visual information with each "level" of cells feeding less but more semantically relevant information up the chain.

C. Application-Level Resource Monitoring and Dependency Mapping

Characterizing what resources an application uses and how it uses them provides an effective approach to determining whether the application can have a detrimental effect on the system. The more requests for resources that an application makes, the greater the risk it represents; this applies to trusted enterprise applications as well as newly installed applications, since even trusted software can be hijacked by malware at runtime to evade antivirus detection. In accordance with embodiments hereof, a system may perform real-time examination and control of the resources used by an application to dynamically determine whether these are legitimate uses and whether or not the resource should be used by the application. In effect, this capability may represent the last line of defense for the overall computational system, as it superimposes a run-time behavioral sanity check on resource use. This defensive approach to protecting system resources may trigger responses such as access blocking if there is doubt as to legitimacy of the application or its use.

Classifying an application as trustworthy or untrustworthy can be based on comparing the observed resource-utilization pattern to what would be expected, e.g., based on historical operation at a given time and place of access. In a healthcare environment, there may be additional strong correlations between the clinical user ID and specific patients the clinician is caring for. This "choke point" for monitoring and controlling resource access by applications may be performed at the point in the application code corresponding to requests to the OS (via system DLLs). Rather than relying on the application vendor to change the software, embodiments of the present invention dynamically modify the application code (e.g., in memory at runtime); this may occur without requiring changes to the application code. As a result, the application continues to call the regular system functions but specific calls are redirected to facilitate another level of pre-call examination, monitoring and access control before the actual system call is made.

Figure 4:
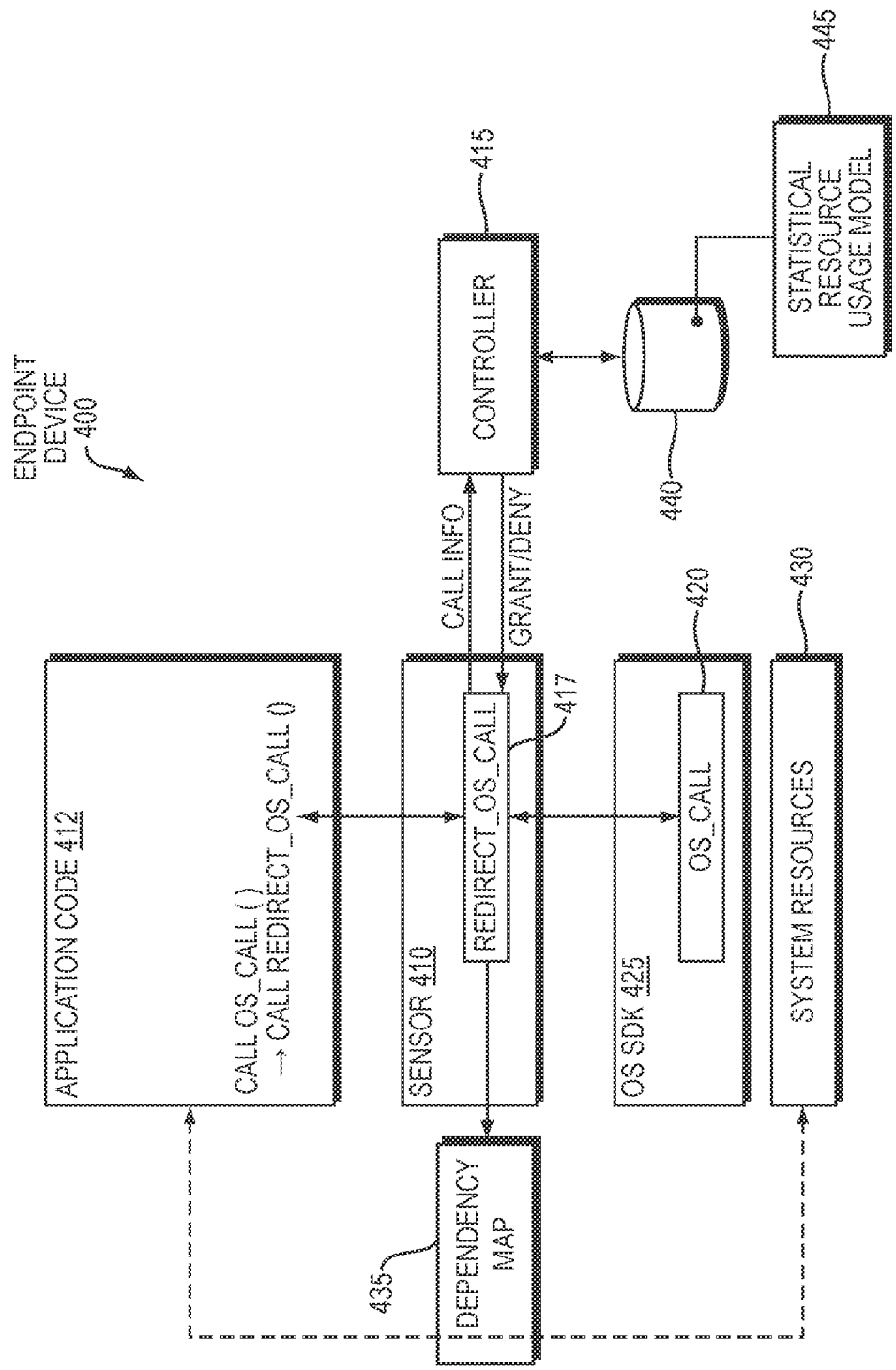
FIG. 4 schematically illustrates components of an application-level of monitoring and control functions in accordance with embodiments hereof.

FIG. 4 shows an endpoint device 400 including a sensor 410 associated with an application 412, as described above, and an intelligent controller 415. In the device 415, however, OS calls are not handled by an API shim as described above; instead, the code of application 412 is modified (either permanently or only at runtime, e.g., by a DLL) to direct, to an intercept, calls that the application 412 would otherwise make directly to the OS. Specifically, an OS function call shown generically as OS Call( ) is redirected to the sensor 410, in particular to an intercept 417, Redirect_OS_Call( ). The Redirect_OS_Call( ) function 417 in the sensor 410 has full visibility to the call arguments and, based thereon, decides whether to call the real OS_Call( ) function 420 in the OS SDK 425. OS calls typically request access to a system resource 430 (i.e., any physical or virtual component of the system, including, for example, stored data, a communication channel, or input/output operations), and the intercept 417 also has access to the results of the actual OS_Call to the requested resource 430; that is, if the call is allowed, the sensor 410, via the intercept 417, can measure the latency for the call by timing the duration taken to complete the OS_Call function.

This intercept mechanism may be injected into the memory image when the application 412 and accompanying DLLs are loaded; techniques for achieving this are well known and used, for example, to inject debugging tools. Once the sensor DLL is injected and specific calls in the application 412 overwritten, application calls to the specified OS functions are automatically redirected to equivalent intercept calls. While it is possible with this mechanism to redirect all system functions, in practical terms it is generally necessary to redirect only specific functions that are used to open, access, or create system resources 430. Indeed, even within those, redirection can be confined only to those that have potential for risk to the system, the application or the data.

Since the sensors 410 are in-line to application calls to the OS, they also provide a control choke point for protecting access to resources by a rogue application. Depending on the type of resource being requested, the intercept function 417 may check with the controller 415 (or an external controller) whether to grant, deny or grant with approval (per use) the request. The intercept functions 417, depending on the nature of the call, may pass relevant details—either from the inbound call arguments or the returned results from the actual OS call—to the controller 415, which may accumulate resource calls into a predictive analytics model as described above; this module makes decisions on new calls based on the evolving model. For example, an external controller 415 may accept sensor information from numerous devices 400 (or at least from all processes, including the browser, running on a single device) and make real-time decisions whether to allow a call based on the policy for resource use, the misuse potential for the call, the specific nature of the call, and the statistical usage model for the user or for the call across users. Once the controller 415 decides on a response, it passes control back to the sensor function 417 to grant, deny, or grant with user approval the application request, returning control back to the application 412. A deny would override the results of the call to the original function and return a corresponding "access denied" response. The response from the controller 415 can override the normal system response and act as an overlay policy enforcement for OS calls.

In specific cases where elevated privileges are required for certain resource requests, a standard IT practice is to allow the user to run at an administrator privilege level and bypass the fine-grained privilege-level checks made for resource access. This policy violates the principle of least privilege, which mandates that users run with as low a privilege as possible so to limit the scope of potential damage if they accidentally introduce malware into the system. Because they are called before the actual OS calls, the intercept functions can modify the security token on resource requests to have elevated privileges just for the duration of the call. This reduces the window of opportunity for compromise and effectively restricts the user to the lowest privilege level while still serving the resource request.

The intercept functions 417 in the sensor DLL may be used first in a "discovery phase" to build a dependency map 435 of system resources 430 used as the application 412 evolves from initial startup to normal use (accepting and processing user input) through application termination or suspension. Dependency maps for all applications may be stored in a mass storage device 440; the storage device 440 may be on-board the endpoint device 400 or, if the controller 415 is external, may be remote and store dependency maps for many devices 400. During initial startup, the intercept 417 records, in the evolving dependency map 435, the type, path, privilege level, function and response to each request made by the application 412 from the moment the process is loaded until the application 412 is ready to accept user input (typically indicated by a call to the OS to enable the user interface). The resources 430 identified during this phase form a namespace that includes registry keys, the user ID, the session ID, the machine name, semaphores, pipes, shared memory segments, URLs, files, external processes and device IDs for any named resources employed by the application. Depending on the type of resource, additional metrics can be monitored such as type of access, response times, privilege level used, count of uses, type of access performed and frequency of calls. These additional attributes can be tracked over time to develop a time-based statistical model of how the user interacts with the resources (or resource types) through the application. Some resources, such as configuration file, for example, might be opened for read-only access and then closed. Each resource request is identified uniquely by the process requesting it, the owner of the process, the privilege level and the ID of the user, the time and duration of the request (from start to finish), details of the request (type, call arguments, etc.) and any path information included in the request (e.g., connect to https:// server/ . . . or open config file://myrecords).

A statistical model 445 of resource utilization, which may be stored in mass storage 440, is built and updated by the controller 415 during the discovery phase (using data from sensors 410 associated with the different applications 412) to capture the association between the application 412 and the resources it employs when servicing one or more users. Variations in the resources used by different users at different endpoints may be captured by having a separate model 445 for each user/device combination. Each statistical model 445 is continuously updated over time to adapt to changes in the application or performance characteristics of the endpoint device 400, the network, and/or different resources (e.g., servers) being used. Statistical models for all applications associated with the device 400 may be organized as a database that is readily queried by user and by application; the objective is to build up user-specific statistical models of resource usage by applications that can be used by the controller 415 to evaluate whether to allow or disallow intercepted function calls, i.e., calls generated by a particular application being employed by a given user; the more firmly the user's patterns have been established in the statistical model 445, the more significance the controller 415 can ascribe to resource requests that deviate from the norm. Usage models for users may also be compared against others in a group of users (e.g., all cardiologists) to calibrate appropriate use. The usage model 445 may be used by the controller's predictive model described earlier.

An entry in the resource usage model 445 specifies not only the resources used but also performance time measurements, so that the basis for what might normally be expected is built up over time (e.g., as a cumulative average or minimum/maximum values). The response time for a network port open, for example, might be characterized as having a mean of 1.5 msec with an expected variance of ±0.5 ms (e.g., two standard deviations). These models are initialized during the discovery phase to characterize the behavior of different applications in how they access resources, and until a particular user's usage patterns have become established, default entries corresponding, for example, to institutional or departmental usage patterns may be used. Latencies in actual use that exceed this range may be flagged as problematic and trigger troubleshooting—not necessarily as a sign of attack but also for purposes of network health and maintenance. The model 445 can be continuously updated (and analyzed) to detect long-term user-specific trends and serve as an indicator of performance degradation. The path for each resource can further be analyzed based on type (file, registry, remote port, URL, etc.) to provide additional information to help the controller 415 determine a corrective response (e.g., to communicate to an actuator as described earlier). An application that normally connects to open a URL in order to access remote services may, for example, find the server taking longer than normal to respond, or the server may be returning more failures than before. Though the server might still be considered functional (i.e., running, albeit slowly), the longer-than-normal delay detected through the sensor 410 provides useful intelligence to help identify and localize the problem.

Sensors may generate data at an extremely high rate, and rather than streaming every event to the controller 415, the sensor 410 may employ a streaming classifier to analyze the sensor data from an application to either compare its performance against historical metrics or apply Bayes classification to establish risk for a series of calls within a time window. The result of applying the streaming classifier is a reduction in the sensor data that is transferred to the controller 415 as well as corresponding risk assessments for each API call (relative to calls within a time window on the stream). The size of the time window used is finite, as it is limited, in various embodiments, to the launch time of the application. Risk and performance metrics are computed by correlating actual sensor data against historical data in the model 445 defined for the application. During discovery, for example, it is more useful to capture the activity within the access life cycle of a resource and report, for example, "a file startup.cfg was opened and 20 reads and 3 writes performed before closing" to further reduce unneeded read/write data by summarizing them as I/O activity.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:
1. A computational system comprising:
 a. a plurality of endpoint devices each comprising:
  1) a processor;
  2) an operating system;
  3) a computer memory; and
  4) instructions stored in the memory and executable by the processor for defining (i) a plurality of user applications, (ii) a plurality of sensors for monitoring calls to the operating system, (iii) a plurality of actuators for causing the processor to take specified actions for mitigating a threat or anomaly, and (iv) an intelligent controller for analyzing successive time windows of sensor data from the sensors based on a predictive response model to detect anomalous behavior, and upon detecting such behavior, instructing an actuator to take a specified mitigation action; and
 b. a network aggregator comprising for receiving data from the intelligent controllers of the endpoint devices, the received data including sensor data and data characterizing anomalous behavior detected by the predictive response models of the intelligent controllers, the network aggregator comprising:
  1) a processor;
  2) a computer memory for storing executable instructions and the predictive response models of the endpoint devices; and
  3) instructions stored in the memory and executable by the processor for (i) updating at least some of the predictive response models based at least in part on data received from a plurality of intelligent controllers and (ii) communicating the updated predictive response models back to the associated intelligent controllers.

2. The system of claim 1, wherein the sensors each include a classifier for assessing a risk associated with the monitored calls to the operating system.

3. The system of claim 2, wherein the classifier is a Bayes classifier.

4. The system of claim 1, wherein each of the applications running on an endpoint device is associated with a unique sensor and a unique actuator, each of the sensors monitoring the calls to the operating system using an API shim.

5. The system of claim 1, wherein the intelligent controllers are configured to assess, after instructing an actuator to take a specified mitigation action, a degree of effectiveness of the mitigation action.

6. The system of claim 5, wherein the data received by the network aggregator from the intelligent controllers includes the degree of effectiveness of the mitigation actions.

7. The system of claim 1, wherein the predictive response models of the intelligent controllers are machine-learning models.

8. The system of claim 7, wherein at least some of the machine-learning models include a supervised learning algorithm.

9. The system of claim 7, wherein at least some of the machine-learning models include an unsupervised learning algorithm.

10. The system of claim 1, wherein the predictive response models are user-specific.

11. The system of claim 10, wherein each endpoint device further comprises a user database having fields for applications hosted by the endpoint device, permitted users for each application, and for each user, a pointer or link to a user-specific predictive model.

12. The system of claim 10, wherein the network aggregator is configured to update the predictive response models based on received sensor data as well as user behavior and privilege levels.

13. A computational method comprising the steps of:
 at a plurality of endpoint devices, executing a plurality of user applications and executing (i) a sensor associated with each of the applications, the sensor for an application monitoring calls to the operating system by the associated application and generating data indicative of the calls, (ii) an actuator associated with each of the applications for taking actions to mitigate a threat or anomaly, and (iii) an intelligent controller for analyzing successive time windows of sensor data from the sensors based on a predictive response model to detect anomalous behavior, and upon detecting such behavior, instructing an actuator to take a specified mitigation action; and
 at a network aggregator, receiving data from the intelligent controllers of the endpoint devices, the received data including sensor data and data characterizing anomalous behavior detected by the predictive response models of the intelligent controllers, the network aggregator (i) updating at least some of the predictive response models based at least in part on data received from a plurality of intelligent controllers and (ii) communicating the updated predictive response models back to the associated intelligent controllers.

14. The method of claim 13, further comprising executing, by the sensors, a classifier for assessing a risk associated with the monitored calls to the operating system.

15. The method of claim 14, wherein the classifier is a Bayes classifier.

16. The method of claim 13, wherein each of the sensors monitors the calls to the operating system using an API shim.

17. The method of claim 13, further comprising assessing, by the intelligent controllers after instructing an actuator to take a specified mitigation action, a degree of effectiveness of the mitigation action.

18. The method of claim 17, wherein the data received by the network aggregator from the intelligent controllers includes the degree of effectiveness of the mitigation actions.

19. The method of claim 13, wherein the predictive response models of the intelligent controllers are machine-learning models.

20. The method of claim 19, wherein at least some of the machine-learning models include a supervised learning algorithm.

21. The method of claim 20, wherein at least some of the machine-learning models include an unsupervised learning algorithm.

22. The method of claim 13, wherein the predictive response models are user-specific.

23. The method of claim 13, further comprising updating the predictive response models based on received sensor data as well as user behavior and privilege levels.

* * * * *